6349X
J. Clarke,
Dam,
Patented Jan. 25, 1831.
No Printed Specification Available
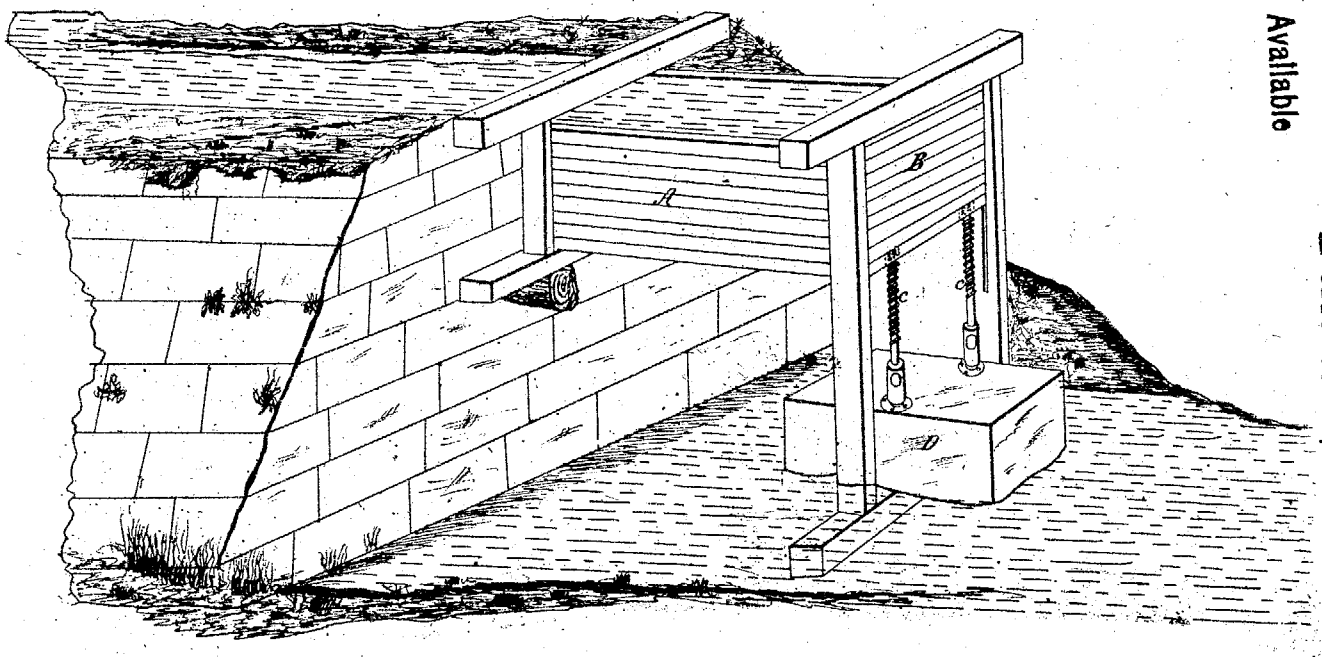

6349X Jany 25. 1831 187

James Clarke
Letters Patent

The Schedule referred to in these Letters Patent and making part of the same containing a description in the words of the said James Clarke himself of his improvement in the machine called a "self regulating Conduit" for passing water around Canal Locks, from a high or to a lower level The bottom of the Conduit connecting with the upper level of the Canal must correspond with the bottom of that level, and be carried to such a point between the upper and lower levels of the canal as shall be found most convenient for the construction of the regulating gate. The lower level of the conduit must be on a plain with the lower level of the canal, or may be sunk as much lower as the particular circumstances of the case may require. The dimensions of the conduit must be regulated in proportion to the quantity of water which it is intended to vent. At the connection of the two levels of the conduit, the regulating gate must be placed & constructed in the following manner. Two or more mud sills are framed together and are placed horizontally at the bottom of the lower level of the conduit, into which two uprights gate posts are placed one on each side of the conduit and extending from the bottom of the lower to the top of the upper level; these posts to be supported by a cap-sill, braces and longitudinal frame work, covered with plank extending each side of the gate, so as to conduct the water to the gate, and to serve as an apron to convey the water over the air box buoy or float. a groove or rabbet must be cut in each of the gate posts so as to receive the gate, and extending from the top of the posts downwards a sufficient distance to admit the top of the gate to be drawn down to the bottom of the upper level of the conduit.
When the size of the Gate shall be such as to prevent it sliding easily in the grooves or rabbets, metal boxes or friction Rollers, will in [illegible] [illegible]

6349X be placed so as to admit a free action of the gate. The gate must
be constructed of plank well jointed and secured together and be
of a heighth corresponding with the depth of the water intended
to be maintained on the upper level. this gate is connected with
an air box. buoy or float. placed in the lower level, which box
buoy. or float. must be of a size and buoyancy sufficient to raise
the gate as the water shall rise in the lower level. This box,
buoy, or float is connected with the gate in the following manner
Two or more screws are required; with flat heads resting on
the top of the box, buoy, or float, and secured to it by metal
plates having holes in them sufficiently large to admit the shank
of the screws to pass upwards through them. When these plates
are fastened to the box, buoy. or float. the heads of the screws
will turn under them, in the manner of a swivel. holes cor-
responding with the screws, must be bored in the lower edge
of the gate, and be of sufficient depth to admit the box. buoy
or float, and the gate to be screwed together or apart so as to
maintain any required quantity of water on either level.
Screw nuts must be placed in these holes so as to govern the gate
The screws are provided with holes in their shanks near the box
buoy, or float to admit the end of a turning bar or lever for
the greater convenience of working them. When it is intended
to maintain a greater quantity of water on the upper than the
lower level, the gate must be screwed from the box buoy or
float. when the greater quantity is required on the lower level, the
gate must be screwed towards the box &c. The operation of the ma
chine will be as follows. The water in passing the conduit will
flow over the top of the gate into the lower level, as the water rises
in the lower level, the buoyancy of the box buoy, or float, will
force the gate upwards until the required quantity is obtain
ed, in the lower level, when the upper section of the conduit
will be closed by the gate. Should the water sink in the lower

6349X sink in the lower level. the weight of the box hung on float will draw the gate downwards so as to admit the water to pass over its upper edge thus producing a regular supply and level depth of water in the Canal at all times as may be desirable W Murphy
W. B. Mitchell
Hm Adams James Clarke Sill 4ft (Passed 25 Jany 1841)